United States Patent [19]

Yamazaki et al.

[11] Patent Number: 5,376,983
[45] Date of Patent: Dec. 27, 1994

[54] LENS BARREL

[75] Inventors: Yasuo Yamazaki, Hino; Toyohiko Kimura, Ina; Shigeo Hayashi, Okaya, all of Japan

[73] Assignee: Olympus Optical Co., Ltd., Tokyo, Japan

[21] Appl. No.: 890,927

[22] Filed: May 29, 1992

[30] Foreign Application Priority Data

May 31, 1991 [JP] Japan .................................. 3-129921

[51] Int. Cl.$^5$ ............................................. G03B 1/18
[52] U.S. Cl. ..................... 354/195.12; 354/286; 359/825; 359/826
[58] Field of Search ............... 354/195.1, 195.12, 286; 359/823, 825, 826

[56] References Cited

U.S. PATENT DOCUMENTS

| | | | |
|---|---|---|---|
| 1,213,731 | 1/1917 | Bornmann | 359/826 |
| 1,720,224 | 7/1929 | Lessler et al. | 359/826 |
| 3,118,359 | 1/1964 | Leitz et al. | 354/195.1 |
| 4,002,405 | 1/1977 | Stahl | 359/823 |
| 4,154,510 | 5/1979 | Katagiri | 359/826 |
| 4,627,691 | 12/1986 | Tomori | 359/823 |
| 4,841,323 | 6/1989 | Yamada et al. | 354/195.1 |
| 4,934,789 | 6/1990 | Lemke | 359/823 |
| 4,993,815 | 2/1991 | Yamazaki et al. | 354/195.12 |
| 5,091,802 | 2/1992 | Imaoka et al. | 354/195.12 |

FOREIGN PATENT DOCUMENTS 2077331 8/1989 Japan .
125312 12/1991 Japan .

*Primary Examiner*—Monroe H. Hayes
*Attorney, Agent, or Firm*—Louis Weinstein

[57] ABSTRACT

When moving frames are incorporated in a fixed frame and a cam ring, the lens barrel according to this invention is ready for fitting cam followers of the moving frames in the fixed frame or a plurality of moving cain grooves disposed on the cam ring irrespective of the number of moving frames to be incorporated, thus inserting the cam followers in the moving cam grooves by way of a single assembling cam groove. Accordingly, an assembling work of the moving frames in the fixed frame and the cam ring will be greatly facilitated and in an arrangement for which the moving cam grooves are provided on the cam ring, since the cam grooves may be bottomed cam grooves, a high rigidity cam ring will be realized. The lens barrel is further provided with a barrier closing assembly for selectively covering and uncovering an object end of the lens barrel. The barrier closing assembly is closed responsive to movement of a zoom unit to a collapsed position and to movement of focussing lens group to a power off position and automatically uncovers the lens barrel responsive to movement of the zoom unit from the collapsed position toward a wide angle position, the opening force being provided by a biasing spring.

33 Claims, 9 Drawing Sheets

LENS BARREL

BACKGROUND OF THE INVENTION

1. Field of the Invention

This invention relates to a lens barrel and, more particularly, to an improved lens barrel having a plurality of lens frames driven by a cam ring.

2. Related Art Statement

In regard to a lens barrel having a plurality of lens frames, there are various systems hitherto proposed such as using a cam ring drive motion, using a helicoid delivery motion and the like. A typical one that uses a cam ring drive motion includes the lens barrel applied to a camera which is disclosed in Japanese Patent Unexamined Publication No. 207731/1989. On the other hand, that of using a helicoid delivery motion includes the lens barrel proposed previously by the inventor per Japanese Utility Model Unexamined Publication No. 125312/1991.

Operating on a cam ring, the camera lens barrel disclosed in Japanese Patent Unexamined Publication No. 207731/1989 is capable of providing a delivery of a non-linear characteristic to lens frames, namely a lens-group frame different from the helicoid type one. However, the cam ring system motion comprises fitting a cam follower in cam grooves of the cam ring externally after inserting the lens-group frame in the cam ring, thus screwing and fixing it to the lens-group frame.

Consequently, the cam grooves must be of the through type. The cam grooves are provided normally at three spots peripherally with reference to one lens-group frame. Accordingly, a rigidity of the cam ring itself decreases unavoidably, and hence the cam ring must be metallic and not plastic in respect of rigidity and precision. Further, as described above, the cam follower must be screwed externally after the lens-group frame is inserted in the cam ring, which leads to an inferior working efficiency for assembling. In this connection, the lens barrel proposed in Japanese Utility Model Unexamined Publication No. 125312/1991 employs a helicoid delivery motion, and hence a driving ring corresponding to the cam ring is high in rigidity making it practical to realize a plastic construction. However, a delivery of a non-linear characteristic cannot be provided to the lens-group frame. Further, a demerit is such that a single driving ring is no longer capable of driving a plurality of lens-group frames.

SUMMARY OF THE INVENTION

It is an object of this invention to provide a lens barrel operating on a cam ring, wherein an assembling efficiency is ensured even from a plurality of fixed frames and moving frames incorporated in the cam ring, and the cam ring may be constructed to have a high rigidity.

In a lens barrel provided with a cam ring having a plurality of moving cam grooves or a fixed frame and a plurality of moving frames provided a cam follower engaging with a cam of the cam ring, the invention comprises maintaining the plurality of cam grooves in communication with an assembling cam groove extending as far as a front end or rear end of the cam ring at each end. Then, after cam followers of the plurality of lens frames are inserted successively from the assembling cam groove, the lens barrel is assembled by turning the cam ring to fit the cam follower of each moving frame in each corresponding cam groove.

The lens barrel of the present invention further includes a barrier closing mechanism for operating a barrier means to selectively cover and uncover the object end of a lens barrel, wherein the barrier means covers the lens barrel when the lens system is moved to a collapsed position and the focussing lens is moved to a power off position, and wherein said barrier means automatically uncovers the lens barrel under control of the barrier closing mechanism when said lens assemblies are moved from the collapsed position toward a wide angle position.

The other features and advantages of this invention will become more apparent in the following description.

DETAILED DESCRIPTION OF THE PREFERRED EMBODIMENT

Figure 1:
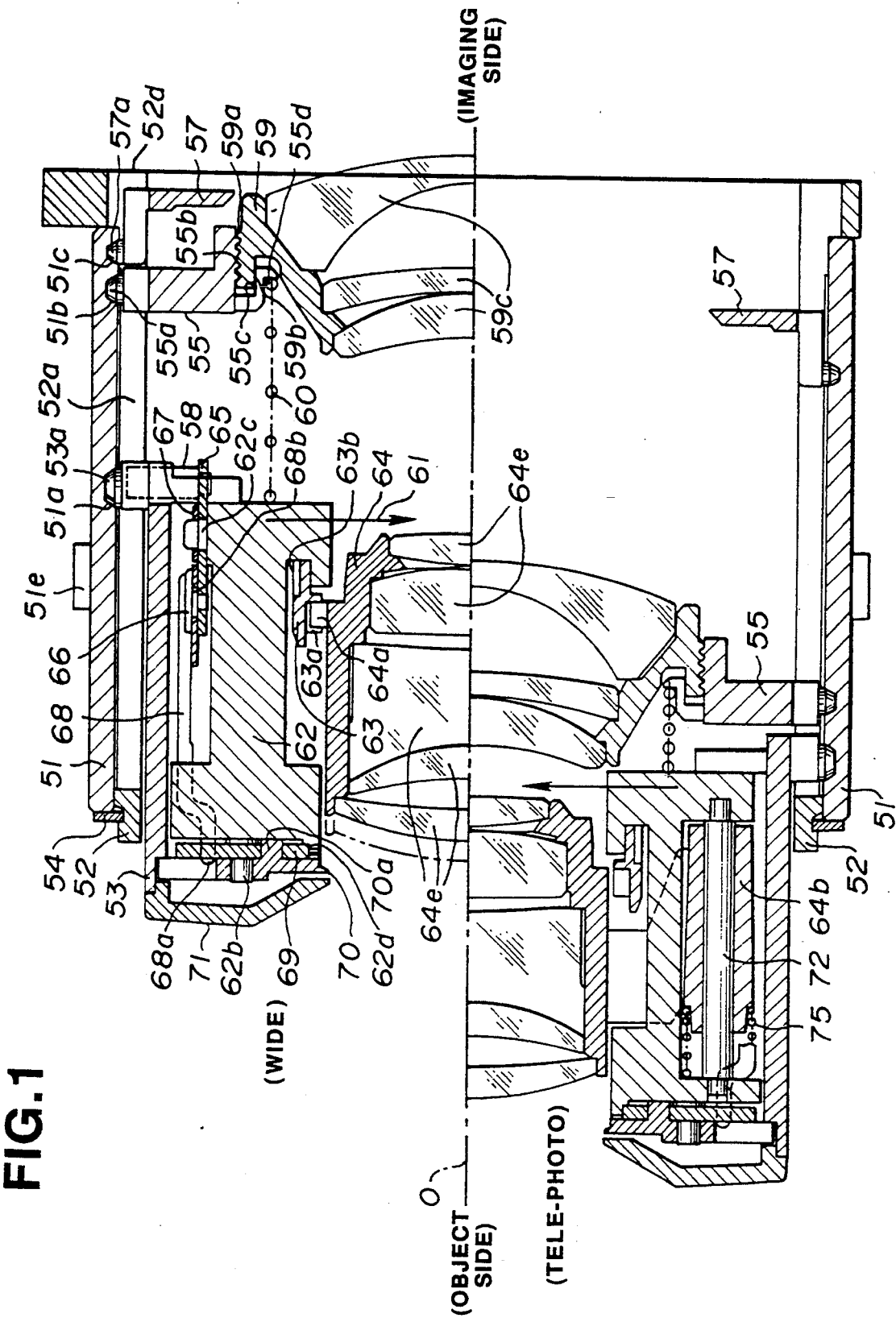
FIG. 1 is a longitudinal sectional view of a zoom lens barrel given in one preferred embodiment of this invention, which is taken along an optical axis in a wide state and a tele-photo state.

The invention will now be described with reference to the illustrated embodiment.

FIGS. 1 to 11 are a longitudinal sectional view, a cam developed view, an exploded perspective view and so forth of a zoom lens barrel given in one embodiment of this invention, which will be then described in detail with reference to the drawings.

The zoom lens barrel uses a two-group lens of inner focus system, comprising a cylindrical cam ring 51 working mainly as a cam frame, a cylindrical fixed frame 52, a moving frame 53 or one of the lens frames, a shutter unit 62, a sector 61 (represented by an arrow and an AF (auto focus) cam 63 supported on the shutter unit, a first lens group holding frame 64 or a lens frame for holding a first lens group 64e or a focusing lens group, a second lens group holding frame 59 for holding a second lens group 59c and a second group zoom frame 55 which is one of the moving frames for supporting the holding frame 59, a flare diaphragm 57 or one of the moving frames, a barrier 70 or a barrier member, a barrier ring 69 or a coupling member, and a barrier operating lever 68 or an engaging member.

First, a construction of a zoom mechanism portion of the zoom lens barrel will be described with reference to FIGS. 1 to 8.

Figure 4:
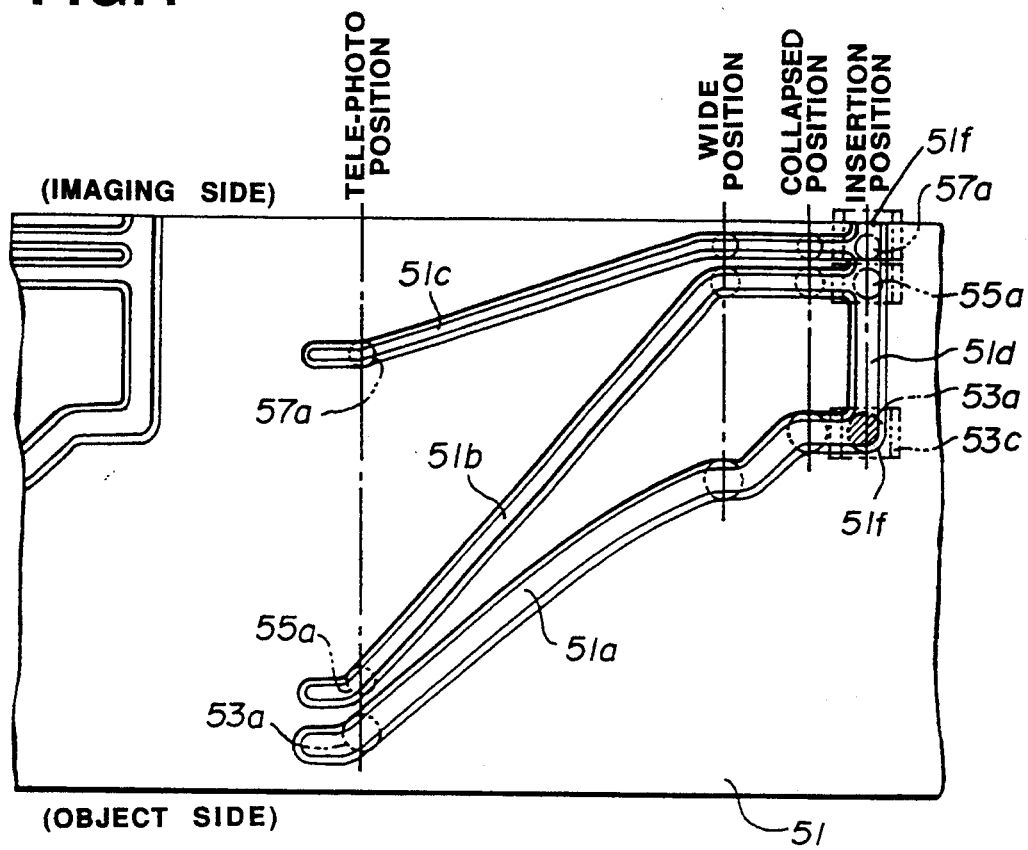
FIG. 4 is a developed view of an inner cam of a cam ring of the zoom lens barrel of FIG. 1.
Figure 6:
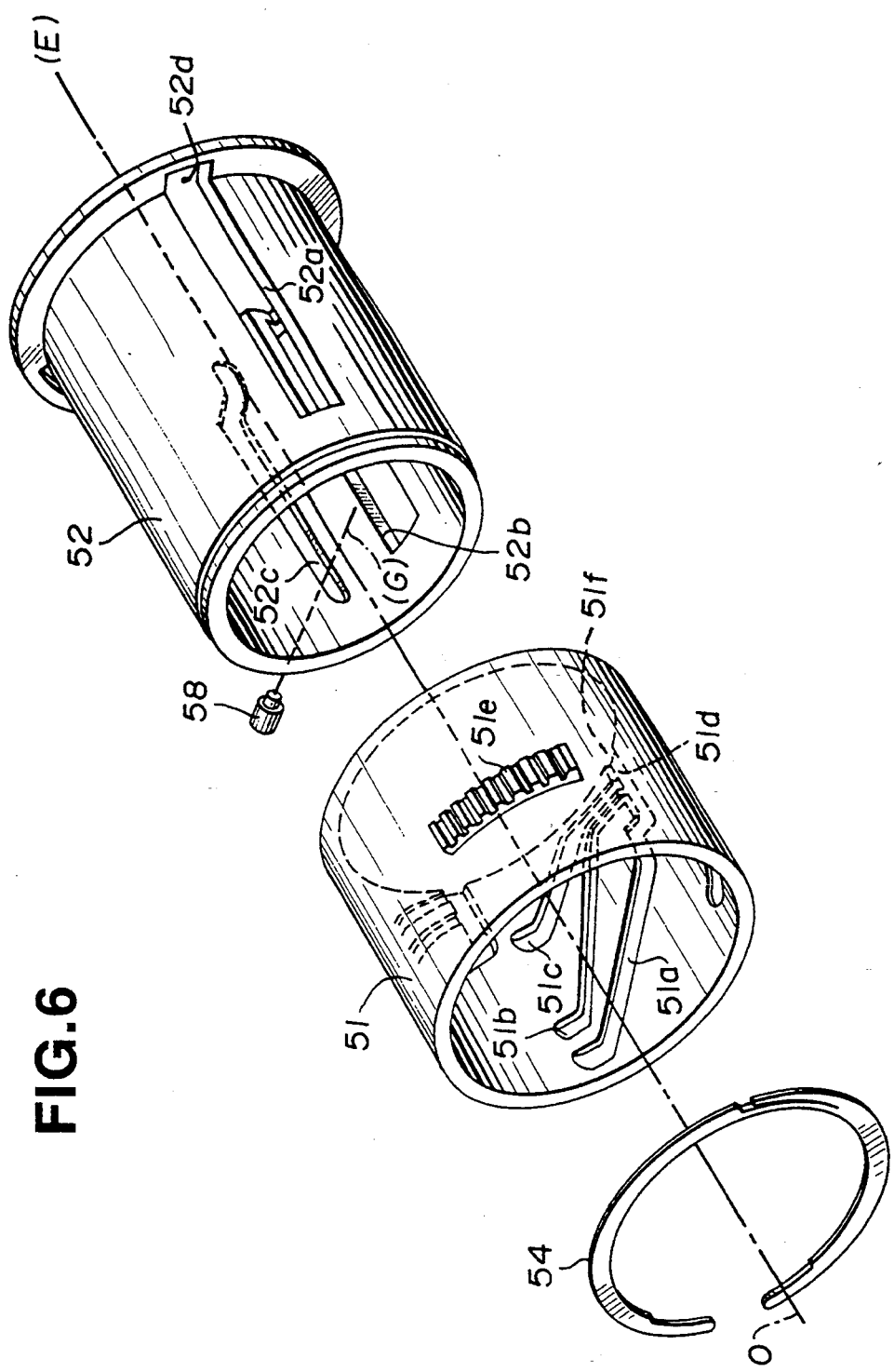
FIG. 6 is an exploded perspective view of the zoom lens barrel of FIG. 1.

The cam ring 51 is fitted rotatably upon an outer periphery of the fixed frame 52. A longitudinal shift of the cam ring 51 in the direction of optical axis 0 is regulated by a stop ring 54. On an inner periphery side of the cam ring 51, an inclined first group inner cam 51a which is a group of a plurality of moving cam grooves, a second group inner cam 51b, and a flare diaphragm inner cam 51c are provided each at three locations dividing the inner periphery into three equal portions (FIGS. 4 and 6). Here, these inner cams are each formed to have a bottomed tapering cam groove. The cams 51a, 51b and 51c are of different widths as shown best in FIGS. 4 and 12. Further, only the first group inner cam 51a changes slantingly further to an imaging side in a section between a wide position and a collapsed position as shown in the developed view of FIG. 4. The inner cams 51a, 51b, 51c join where the inner cams 51a, 51b, 51c further turn from the collapse positions, thereby forming a pin insertion groove 51d which is a common communicating assembling cam groove. The pin insertion groove 51d extends in the direction of the optical axis linearly as far as a rear end surface of the cam ring 51, thus forming an open portion 51f. Pin 53a of the moving frame 53, A pin 55a of the second group zoom frame 55 and a pin 57a of the flare diaphragm 57 are cam followers and fit in the cams 51a, 51b and 51c respectively pins 53a, 55a, and 57a do not interfere with the pin insertion groove 51d in the working range covering tele-photo position, wide position and collapsed position.

A zoom gear 51e for driving the cam ring 51 is provided on an outer periphery of the cam ring 51.

Figure 2:
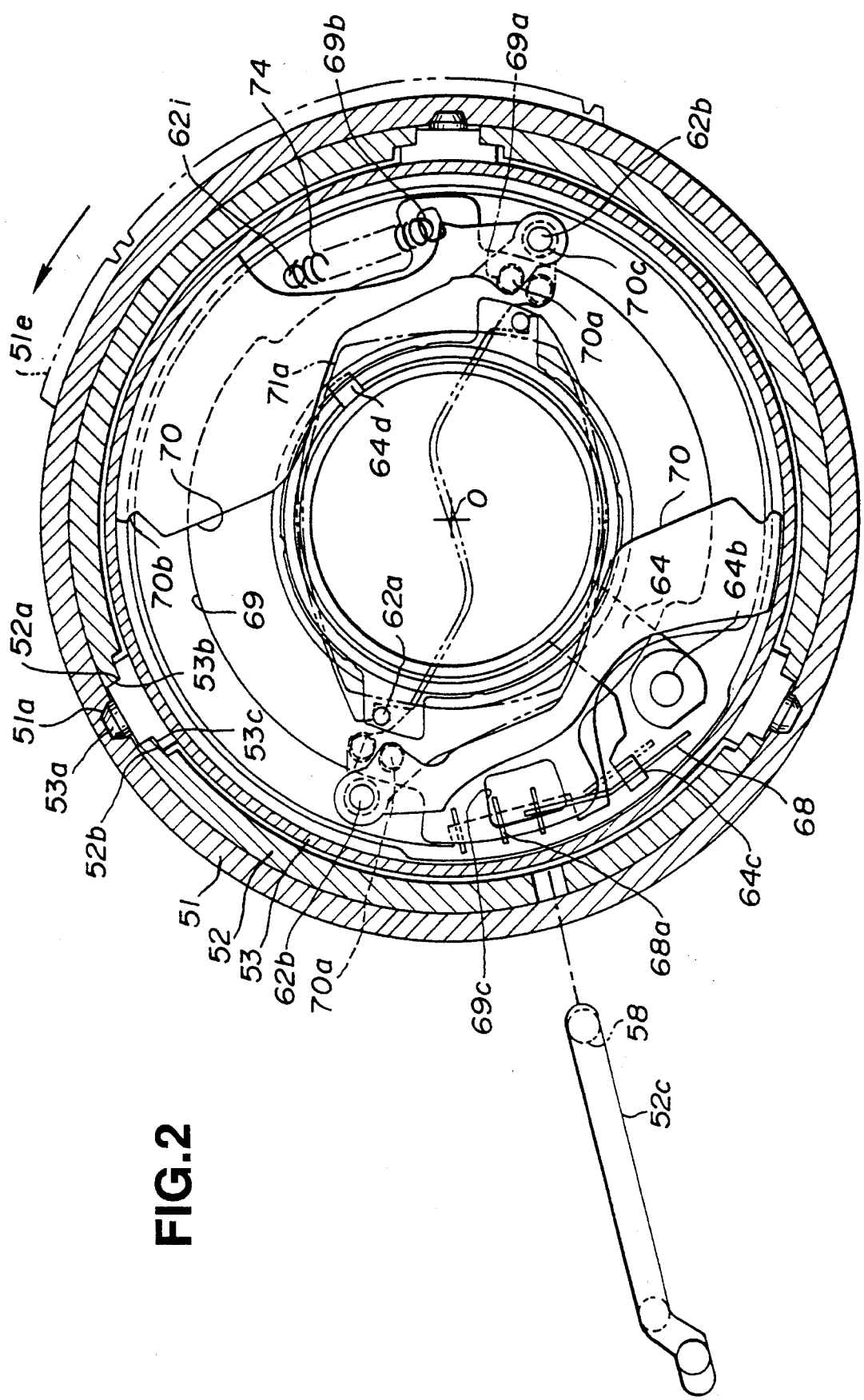
FIG. 2 is a longitudinal sectional view indicating an operating state of a barrier of the zoom lens barrel of FIG. 1 viewed from an object side.
Figure 3:
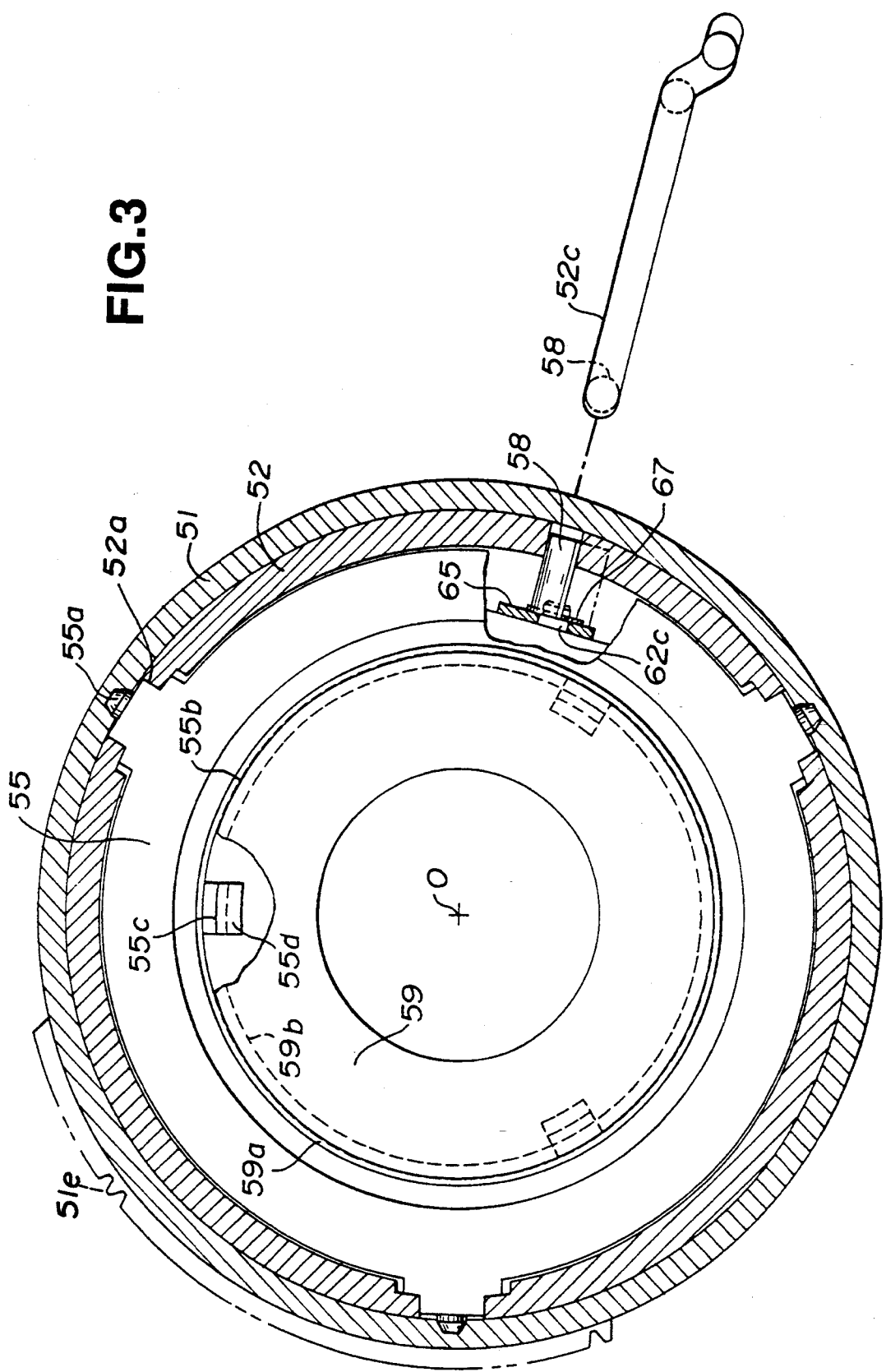
FIG. 3 is a longitudinal sectional view indicating a fitted state of a second group zoom frame and a second group lens holding frame of the zoom lens barrel of FIG. 1 viewed from an imaging side.

On the other hand, three rotation regulating grooves 52a, each of which is a straight cam groove parallel with the optical axis 0, are provided on the fixed frame 52 at three locations dividing the circumferential direction into three equal portions. A rotation regulating portion 53b and a radial fitting portion 53c which are cam followers of the moving frame 53, and guide portions 55e and 57b which are cam followers of the second group zoom frame 55 and the flare diaphragm 57 respectively are fitted slidably in associated ones of the grooves 52a. Movement in a rotational direction is regulated (i.e. prevented) by a side of the rotation regulating groove 52a, and movement in a radial direction is regulated (i.e. prevented) by a radial fitting portion 52b provided in the rotation regulating groove 52a. Further, the groove 52a extends as far as an end surface of the fixed frame 52 to form an open portion 52d (FIGS. 2 and 6). Additionally, an interlocking pin cam 52c in which an interlocking pin 58 is slidably fitted is provided between two of the rotation regulating grooves 52a. The cam forms in parallel with the optical axis O at a cam 52c developed portion of FIGS. 2, 3 or between a tele-photo position and a wide position as shown in FIG. 6 but slantingly between a wide position and a collapsed position.

Figure 8:
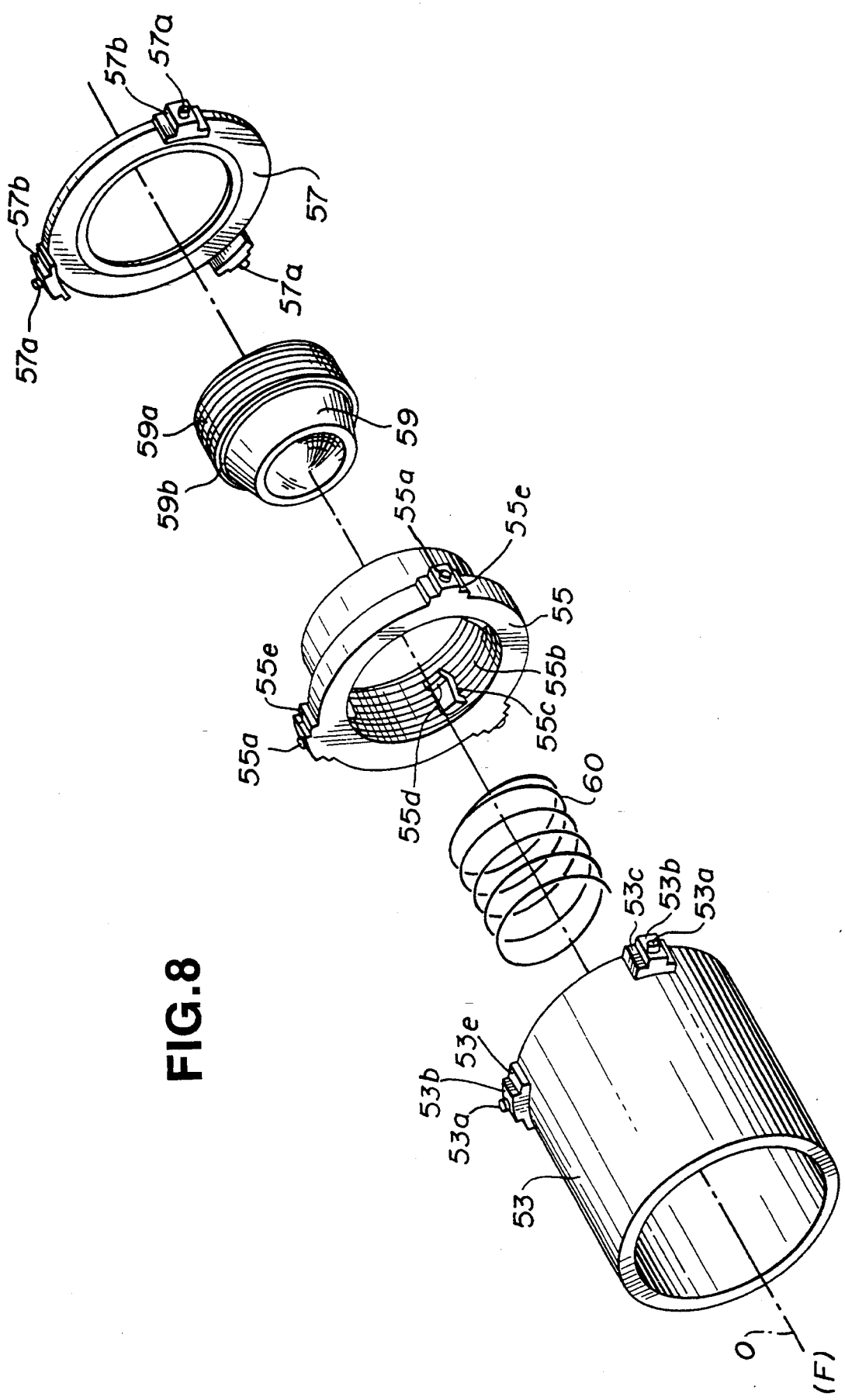
FIG. 8 is an exploded perspective view of another portion of the zoom lens barrel of FIG. 1.

The rotation regulating portion 53b and the radial fitting portion 53c and the pin 53a which is a tapering cam follower are each provided integrally on a rear (imaging side) outer periphery of the moving frame 53 at the positions where the circumferential direction is divided into three equal portions (FIG. 8). Further, as described above, the rotation regulating portion 53b and the radial fitting portion 53c are fitted in the rotation regulating groove 52a and the radial fitting portion 52b of the fixed frame 52, and the pin 53a is fitted slidably in the inner cam 51a of the cam ring 51. Still further, the shutter unit 62 for holding the first lens group holding frame 64 or a focusing lens group holding frame slidably in the direction of the optical axis 0 is mounted on an inner periphery side of the moving frame 53. Here, the first lens group holding frame 64 holds the first lens group 64e of the focusing lens group.

The guide portion 55e fitted in the rotation regulating groove 52a of the fixed frame 52 as in the case of the above moving frame 53 and the pin 55a or a tapering cam follower which is fitted slidably in the inner cam 51b of the cam ring 51 are provided on an outer periphery of the second group zoom frame 55 at three locations dividing the circumferential direction into three equal portions (FIGS. 1 and 8).

Further, a helicoid screw portion 55b is provided on its inner periphery, and threadedly engages a helicoid screw portion 59a of the second lens group holding frame 59. Still further, a solid clawlike spring bearing 55d which is an elastic body is provided on an inner periphery side front (object side) at three locations dividing the circumferential direction into three equal portions. The clawlike spring bearing 55d is elastically deformable and L-shaped, and when a press surface 59b of the second group lens frame 59 comes thereinto, a deflection arises radially slightly on the spring bearing 55d, thus generating a pressing force between the press surfaces 55c and 59b. By a frictional holding of the pressing force, lost motion is prevented, and thus a position for adjusting the second group zoom frame 55 of the second lens group holding frame 59 is retained so as not to change easily by an external force such as drop impact or the like.

A shift of a focusing position at the time of zooming can be adjusted securely in consequence by moving the second lens group holding frame 59 longitudinally with reference to the second group zoom frame 55 by means of screw portions 55b, 59a.

Here, a second group spring 60 is interposed between the shutter unit 62 and the second group zoom frame 55, functioning to remove a lost motion between the inner cams 51a, 51b of the cam ring 51 and the pins 53a, 55a from fitting together. Further, the guide portion 57b fitted in the rotation regulating groove 52a of the fixed frame 52 as in the case of the second group zoom frame 55 and the pin 57a or a tapering cam follower which is fitted in the inner cam 51c of the cam ring 51 are provided on an outer periphery of the flare diaphragm 57 at three locations dividing the circumferential direction into three equal portions (FIGS. 1 and 8).

Described next are zooming and collapsing operations of the zoom mechanism constructed as above.

A gear of a zoom motor unit not indicated therein engages with the gear 51e of the cam ring 51, the zoom motor unit operating for zooming and collapsing drives.

Assuming now the lens barrel is kept wide, if the cam ring 51 is turned counterclockwise viewed from the object side by the zoom motor unit, then the moving frame 53, the second group zoom frame 55 and the flare diaphragm 57 are delivered straight by the pins 53a, 55a and 57a respectively.

Then, the first lens group 64e, the second group lens 59c and the flare diaphragm 57 are also delivered as far as a tele-photo position each to a tele-photo state. When turned clockwise consecutively, the frames 53, 55 and the flare diaphragm 57 will be delivered further to a collapsed position by way of a wide position.

Next, a construction of a focusing mechanism of the zoom lens barrel will be described with reference to FIGS. 1 5 and 7.

The AF (auto focus) cam 63 is fitted rotatably in a rear inner periphery on an imaging side of the shutter unit 62. A gear portion 63b is provided on an outer periphery of the AF cam 63, which is driven to rotate by a focus motor 84. Further, a cam face 63a is provided on the inner periphery. Additionally, the first lens group holding frame 64 holding the first lens group 64e is disposed inside of the AF cam 63. The first lens group holding frame 64 is supported slidably by having a bearing portion 64b integral with the holding frame 64 fitted to receive a focus shaft 72 supported on the shutter unit 62. Further, a pin 64d for stopping rotations of the shutter unit 62 is provided on the holding frame 64. Additionally, an AF cam contact pin 64a of the first lens group holding frame 64 is kept in contact with the AF cam face 63a by an energizing force of an AF spring 75. Accordingly, the holding frame 64 will move in the direction of the optical axis O according as the AF cam 63 rotates.

A focusing operation of the focusing mechanism constructed as above will then be described with reference to FIGS. 1 and 5.

In accordance with a power switch being on, a focus motor shifts the AF cam 63 until the contact pin 64a reaches a reset position. Then, upon receipt of a focusing signal, the focus motor is reactuated, an AF switch is turned on and an AF pulse counting is commenced. According to a range information by an AF device not indicated, the AF cam 63 stops between an infinite position and a near position, thus ending the focusing operation. The shutter is operated thereafter, the focus motor is reactuated, the AF switch is turned off at a peak position (lift amount LT) of the cam face 63a, and the power switch is turned off.

Next described is a barrier closing mechanism of the zoom lens barrel with reference to FIGS. 1 to 11.

Figure 7:
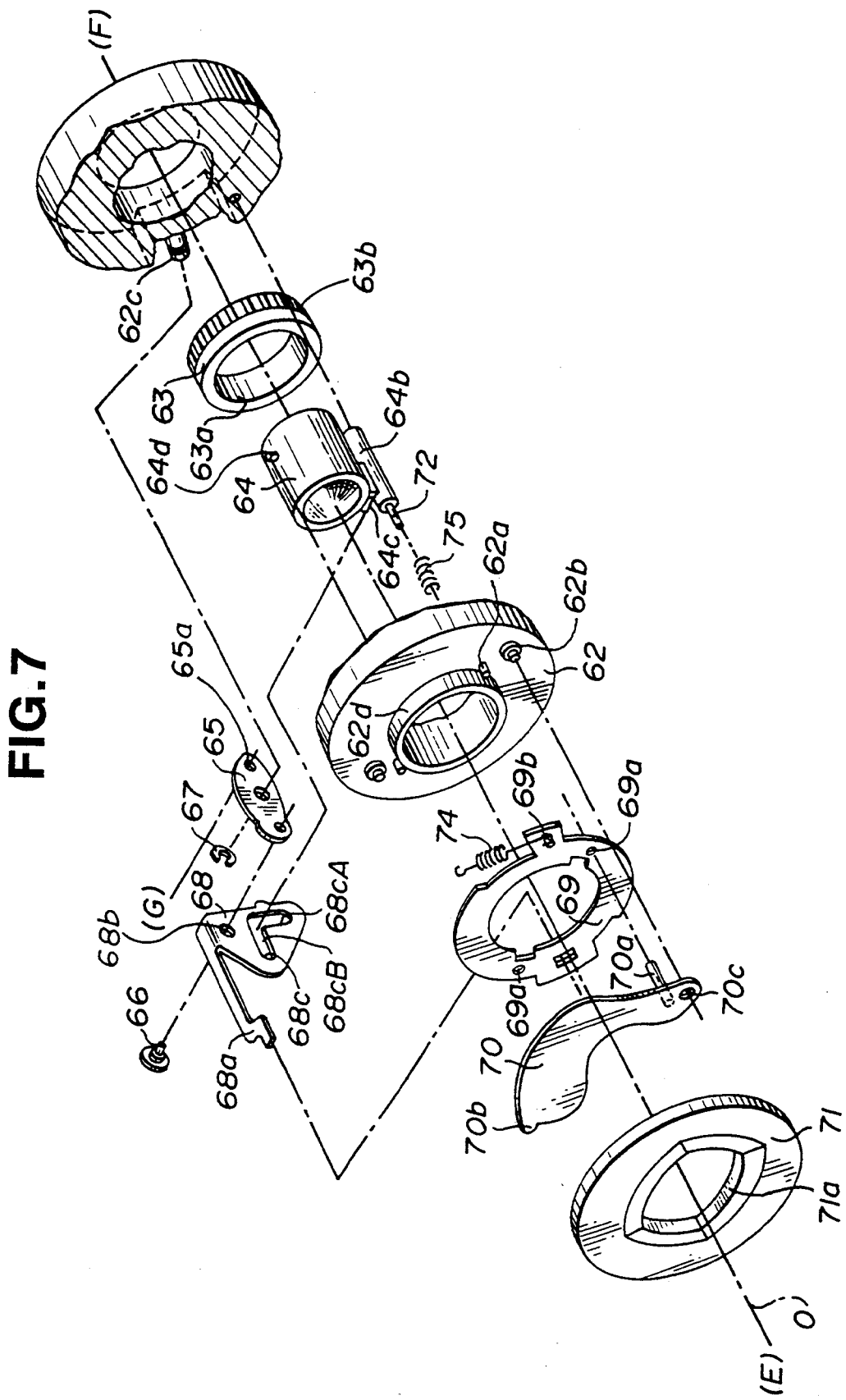
FIG. 7 is an exploded perspective view of one portion of the zoom lens barrel of FIG. 1

As shown in FIG. 7, an interlocking lever live spindle 62c is provided on a rear (imaging side) external portion of the shutter unit 62, and an interlocking lever 65 is fitted rotatably therein. A regulation (i.e. limiting) of the lever 65 in the live spindle direction is carried out by an E-type stop ring 67. Further, the interlocking lever 65 is provided with a screw portion 65a rearward thereof, and the screw portion 65a threadedly engages the interlocking pin 58 fitted in the interlocking pin cam 52c of the fixed frame 52 from an outer periphery of the fixed frame 52. Additionally, a live spindle 65 in which the barrier closing lever 68 is fitted rotatably is fixed to a front portion of the interlocking lever 66 through calking. Accordingly, the barrier closing lever 68 is capable of rotating about the live spindle 66 fitted in a shaft hole 68b thereof.

Figure 9:
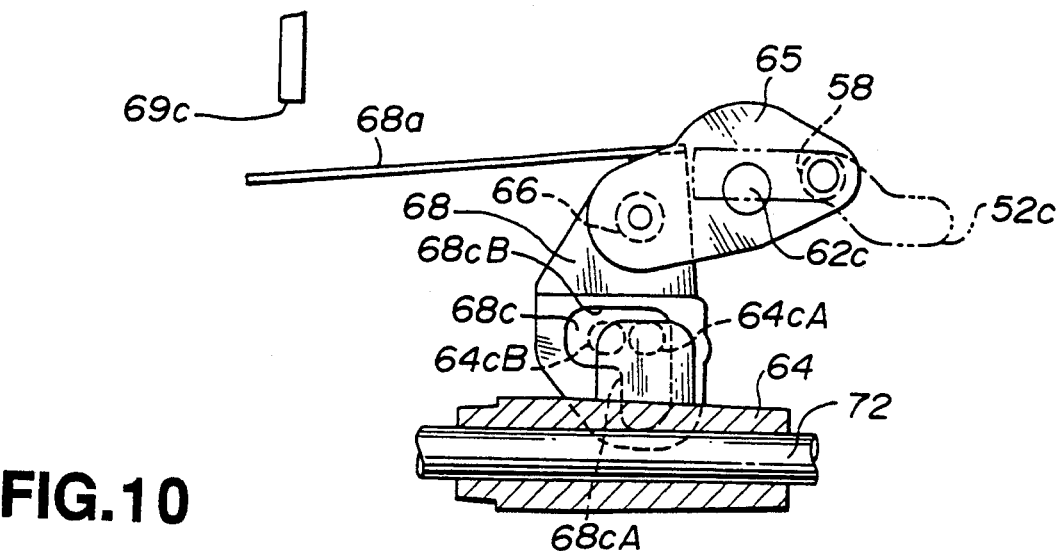
FIG. 9 is an illustration indicating a working state of a barrier operating lever at the time when the zoom lens barrel of FIG. 1 is kept wide.
Figure 10:
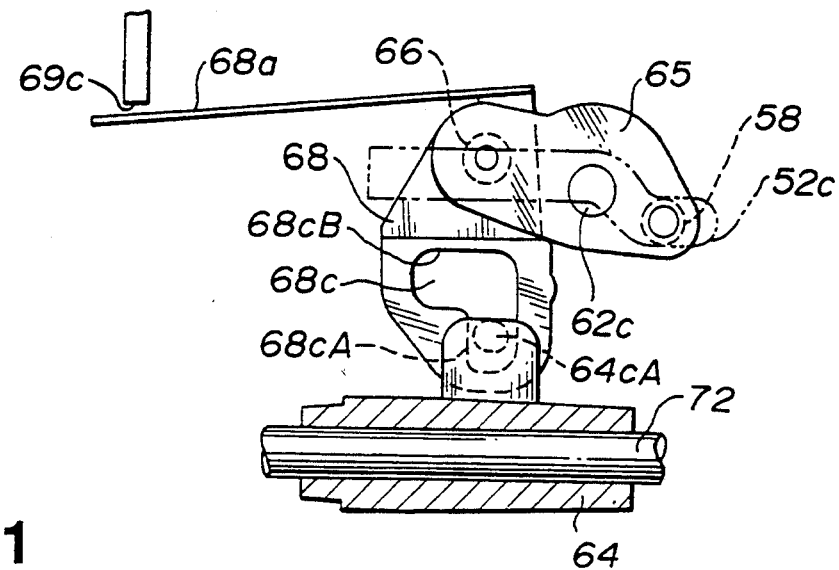
FIG. 10 is an illustration indicating a working state of the barrier operating lever at the time when the zoom lens barrel of FIG. 1 is kept collapsed.
Figure 11:
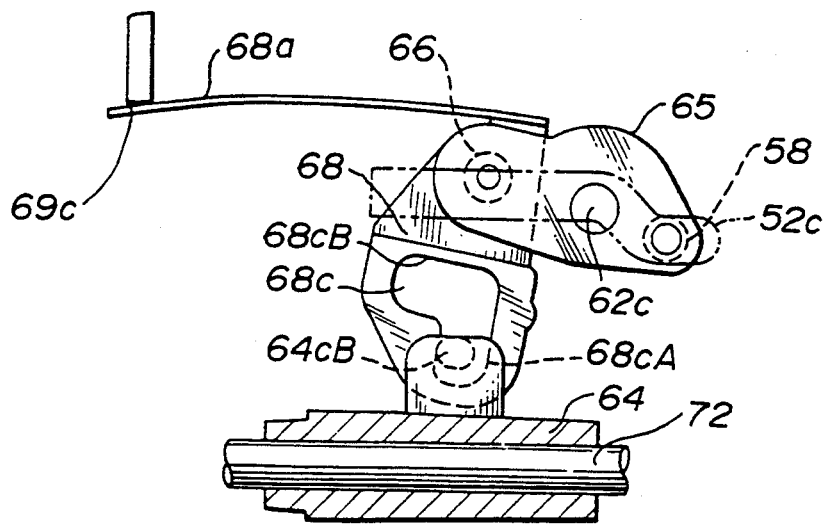
FIG. 11 is an illustration indicating a working state of the barrier operating lever at the time when the zoom lens barrel of FIG. 1 is kept collapsed and a barrier is closed.

As illustrated in FIG. 9 indicating a wide state, FIG. 10 indicating a collapsed state, and FIG. 11 indicating a collapsed and barrier-closed state, the barrier closing lever 68 has an angulate cam groove 68c formed of a groove portion 68cB parallel with the optical axis O and another groove portion 68cA in the direction orthogonal substantially to the groove portion 68cB, and a pin 64c provided on the first lens group frame 64 is inserted in the cam groove 68c. The pin 64c reciprocates between pin positions 64cA and 64cB in the cam groove 68cB, as shown in FIG. 9, during the focusing operation, and since the pin 66 of the interlocking lever 65 does not shift, the barrier closing lever 68 does not change its position.

Meanwhile, at the time of collapse, the interlocking pin 58, which is screwed at the rear of the interlocking lever 65, is turned clockwise round the interlocking lever live spindle 62c by the interlocking pin cam 52c of the fixed frame 52, and the barrier closing lever 68 rises upward as shown in FIG. 10.

The pin 64c of the first group lens holding frame 64 then comes into the groove portion 68cA of the barrier closing lever 68. In such state, if the first group lens holding frame 64 is shifted in the object direction (near), the closing lever 68 is turned clockwise as shown in FIG. 11. An arm portion 68a has an elasticity working in the direction where the closing lever 68 is turned, assuming an elastic deformation in this state. Further, the barrier 70 or a barrier member is closed thereby as described hereinlater.

The barrier ring 69 or a coupling member which is supported rotatably on a ring support portion 62d of the shutter unit 62 is disposed at the front of the barrier closing lever 68. The arm portion 68a of the closing lever 68 is brought into contact with a contact portion 69c of the barrier ring 69, and when the barrier closing lever 68 is turned clockwise as mentioned above, that is, in the direction where the barrier is closed, the barrier ring 69 is turned clockwise viewed from the object side (FIG. 2).

Further, the barrier ring 69 as provided with a spring rigging 69b, a barrier release spring 74 is arranged against a spring rigging 62i of the shutter unit 62, thus it is energized at all times counterclockwise viewed from the object side. Further, the barrier ring 69 is provided with barrier driving holes 69a at positions symmetrical with reference to the optical axis 0, and two pins 70a of the barriers 70 are fitted therein. Still further, each barrier 70 is fitted rotatably in a barrier live spindle 62b of the shutter unit 62. Accordingly, when the barrier ring 69 is turned clockwise viewed from the object side, the barrier 70 is closed (FIG. 2).

At the time when the barrier is closed, a close stopper portion 70b comes in contact with a barrier close stopper 62a of the shutter unit 62, and when the barrier opens, a back side of the barrier 70 comes in contact with an inner wall of the moving frame 53. Then, in a usual working state, the barrier ring 69 is turned counterclockwise by an energizing force of the barrier release spring 74, and the barrier 70 will be kept closed.

A barrier cover 71 is mounted in the front of the shutter unit 62, regulating a thrust of the barrier ring 69 and the barrier 70. In this connection, the barrier 70 is constructed of two pieces vertically as shown in FIG. 2, which function for the same closing operation.

A closing operation of the barrier closing mechanism constructed as above will be described.

In a wide or tele-photo state, when the power switch is turned off, the cam ring 51 is turned as far as the collapsed position or a lens contained position by a zoom motor unit 83. The moving frame 53 moves backward according to its rotation, and the interlocking lever live spindle 62c of the shutter unit 62 also moves backward at the same time.

Then the interlocking lever 65 is turned clockwise as shown in FIG. 10 by the interlocking pin cam 52c of the fixed frame 52, the barrier closing lever 68 rises and the pin 64c of the first group lens holding frame 64 comes into the cam groove 68cA of the closing lever 68.

Figure 5:
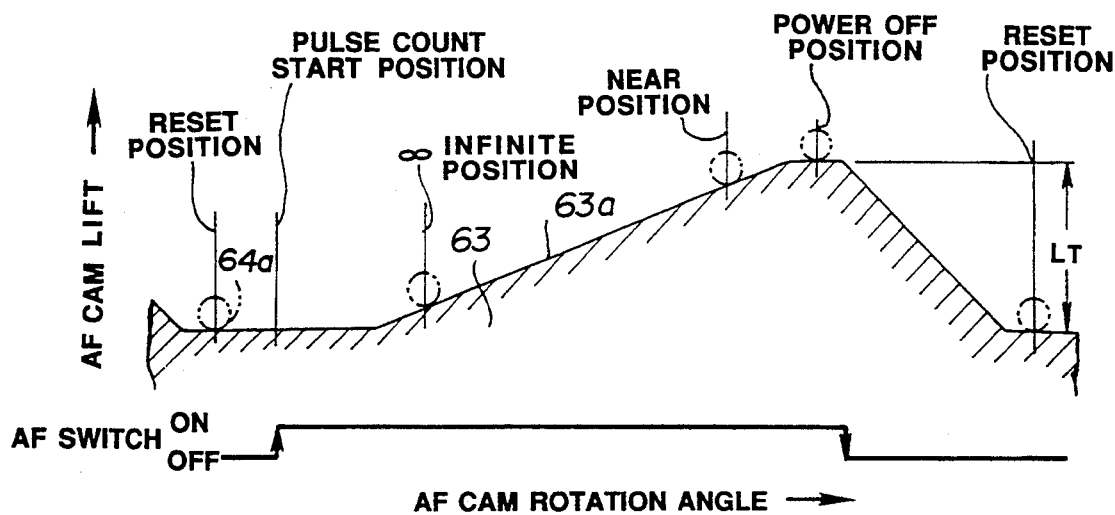
FIG. 5 is a developed view of an AF cam of the zoom lens barrel FIG. 1.

Meanwhile, the focus motor is actuated and as shown in FIG. 5, the cam rotates from a reset position to a power-off position of cam lift peak according to a rotation of the AF cam 63 and then stops. In this case the pin 64c of the first lens group holding frame 64 has shifted from a position of 64cA to a position of 64cB, and the barrier closing lever 68 is pushed by the pin 64c to rotate to the state shown in FIG. 11. The barrier ring 69 turns clockwise viewed from the object side against the force of barrier release spring 74, and the barrier 70 is turned in the closed direction to come in contact with the closed stopper 62a. In the close state, the arm portion 68a of the barrier closing lever 68 has deformed on elasticity as shown in FIG. 11, and holds the closed state with an energizing force charged therein for absorbing a dimensional dispersion.

Consecutively, when the power switch is turned on for photographing, the focus motor shifts the cam as shown in FIG. 5, the AF cam 63 turns, descends a slope of the cam 63a, returns again to the reset position and slops once. The pin 64c of the first lens group holding frame 64 moves back to a position of 64cA as shown in FIG. 10 according to its operation, therefore an energizing force by the barrier closing lever 68 does not work any more. Then, the barrier ring 69 is turned by an energizing force of the barrier release spring 74, the barrier 70 opens to come in contact with an inner wall of the moving frame 53, thus stops at an open state.

Further, when the zoom motor is actuated, the lens barrel returns from a collapsed state to a wide state, the interlocking lever 65 is turned counterclockwise as shown in FIG. 9 by the interlocking pin cam 52c of the fixed frame 52, and the barrier closing lever 68 descends downward. Then, the pin 64c of the first lens group holding frame 64 is present in the cam groove 68cB of the closing lever 68, and returns from a position of 64cA to a position of 64cB. Despite focusing in this state, the situation is such that the pin 64c merely reciprocates in the cam groove 68cB as shown in FIG. 9 and the barrier closing lever 68 will not be turned, and hence the barrier 70 remains open.

Described next is a procedure for assembling the zoom lens barrel of this embodiment with reference to FIG. 4 and FIGS. 6 to 8.

First, the cam ring 51 is fitted in the fixed frame 52, and the cam ring 51 is turned and held with a circumferential position of the rotation regulating groove open portion 52d of the fixed frame 52 and the cam groove open portion 51f of the cam ring 51 coinciding with the optical axis open direction. The moving frame 53 in which the shutter unit 62 and other components are incorporated is then fitted therein, and the second group spring 60, the second group zoom frame 55 and the flare diaphragm 57 are fitted therein in that order. In this case, the moving frame 53 has its pin 53a place into the linear pin inserting groove 51d which is an assembling cam groove communicating with the inner cams 51a, 51b, 51c by way of the open portion 51f provided on a rear end surface of the cam ring 51, and similarly the second group zoom frame 55, the pins 55a and 57a of the flare diaphragm 57 are placed into the pin inserting groove 51d successively by way of the open portion 51f. Then, the rotation regulating portion 53b of the moving frame 53, the guide portion 55e of the second zoom frame 55, and the guide portion 57b of the flare diaphragm 57 are also fitted in the rotation regulating groove 52a concurrently by way of the open portion 52d of the fixed frame 52, By rotating the cam ring 51 in this state, the pins 53a, 55a, 57a are fitted in the inner cams 51a, 51b, 51c of the cam ring 51 respectively, thus incorporating each frame member therein.

Figure 12:
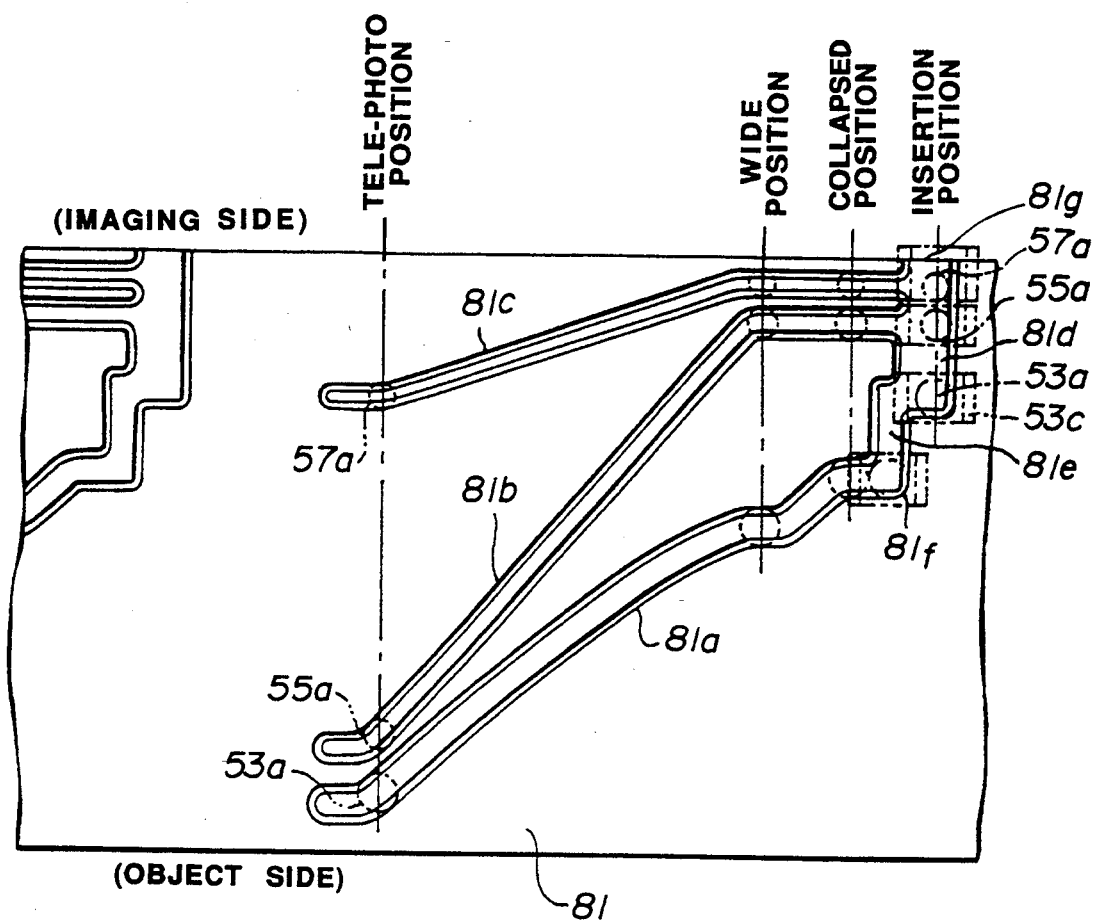
FIG. 12 is a developed view of an inner cam portion exemplifying an alternative of a cam ring of the zoom lens barrel of FIG. 1.

FIG. 12 is a developed view of a cam exemplifying an alternative of the cam ring of the above-described zoom lens barrel. The cam ring in the above embodiment of FIG. 4 has its pin inserting groove 51d formed linearly, however, in a cam ring 81 of the alternative embodiment, a pin inserting groove 81d or an assembling cam groove communicating with the inner cam is cranked. An open portion 81g of the pin inserting groove 81d is provided an a rear end side, namely at imaging side as in the case of the above-described embodiment. A fitting order of each member in the procedure for assembling that of this alternative is same as the above-described embodiment, however, a state wherein each pin is fitted in the inner cam corresponding thereto is different. More specifically, the moving frame 53 is fitted in the fixed frame 52 with the cam ring 81 fitted therein, then the second group spring 60, the second group zoom frame 55 and the flare diaphragm 57 are then fitted consecutively in that order, and, as shown in FIG. 12, the pins 53a, 55a and 57a are fitted first in a linear portion of the pin inserting groove 81d.

By rotating the cam ring 81 slightly, the second group zoom frame 55 and the pins 55a, 57a of the flare diaphragm 57 are fitted in inner cams 81b, 81c slightly accordingly. However, since the moving frame 53 is energized to the object side by the second group spring 60, the pin 53a of the moving frame 53 comes into a crank portion 81e of the pin inserting groove 81d and contacts with a stopper portion 81f. By rotating further the cam ring 81 consecutively, all the pins 53a, 55a, 57a are fitted in the inner cams 81a, 81b, 81c respectively.

In this alternative, where the cam ring 81 is rotated slightly until the pin 53a comes in contact with the stopper portion 81f, since the pins 55a, 57a have slightly entered into the inner cams 81b, 81c, the second group zoom frame 55 and the flare diaphragm 57 will never come out externally on an energizing force of the second group spring 60. In the case of the above-described embodiment, in the state where the pin 53a of the cam ring 51 comes in contact with the stopper 51f of the cam insertion port 51d, the second group zoom frame 55 and the flare diaphragm 57 are capable of coming out externally on an energizing force of the second group spring 60, which is disadvantageous for facilitating the assembling work, and hence such disadvantage is removed by this alternative.

In the above-described embodiment and the alternative embodiment it is specified that the open portions 51f, 81g of the pin inserting grooves 51d, 81d in which pins of each frame member are inserted at the time of assembling are present an the rear end side, namely imaging side, however, these may alternatively be disposed on the object side. In this case, an assembling order of each frame member will be reversed from that of the above-described embodiment.

Further, in the above-described embodiment, the rotation regulating groove 52a is provided on the fixed frame 52 side, and the inner cams 51a, 51b, 51c or a plurality of moving cam grooves are provided on the rotatable cam ring 51 side, however, as an alternative, the inner cams or a plurality of moving cam grooves will be provided on the fixed frame side, and the rotation regulating groove will be provided on the rotatable cam ring side, thereby constructing the lens barrel of the alternative arrangement.

As described above, in the lens barrel of the embodiment or the alternative, from using an assembling cam groove communicating with the cam grooves, a plurality of moving frames can easily be incorporated in the fixed frame and the cam ring, Further, since the inner cams or moving cam grooves can be formed of a bottomed groove, a through groove portion leading to an outer periphery of the cam ring can be eliminated. Accordingly, a rigidity of the cam ring can be increased, a plastic construction may easily be realized, thus obtaining a cam ring high in precision and moderate in cost. Further, since a through groove portion is not present on an outer periphery of the cam ring, the driving gear can be provided integrally, and a shading efficiency of each frame member or the lens frame can be enhanced. Additionally, since the common rotation regulating groove of the fixed frame functions for guiding each frame member, a lens barrel with an inter-group relative eccentricity minimized will be obtainable.

The zoom lens barrel according to the embodiment and its alternative described as above is a two-group type zoom lens, however, a gist of this invention is applicable likewise to a single focusing camera provided with a position for containing the lens. Further, the collapsing operation is carried out on a zoom motor in the above-described embodiment, however, the invention may be applied to a lens barrel collapsible by hand.

What is claimed is:

1. A lens barrel comprising:
   a plurality of moving frames for holding and moving lenses, said lenses having a common optical axis;
   cam followers provided on each of said moving frames;
   a fixed, stationary frame having substantially linear cam slots for said cam followers to shift slidably, the cam slots being open at only a first end surface of the fixed frame;
   a one-piece cylindrical cam ring rotatably mounted on an outer said of said fixed frame and having a plurality of bottomed cam grooves arranged transverse to said optical axis, for each of said cam followers to shift slidably for moving said moving frames in a direction of the optical axis, the cam grooves being formed to extend to a first common end surface of the cylindrical cam ring to facilitate insertion of the cam followers; and
   means to prevent movement of said cam ring in a longitudinal direction along said optical axis.

2. The lens barrel as defined in claim 1, further comprising a plurality of lenses, each of said moving frames holding one of said lenses.

3. The lens barrel as defined in claim 1, wherein the cam slot of said fixed frame is a rectilinear slot arranged parallel with an optical axis.

4. A lens barrel, comprising:
   a plurality of moving frames each having a cam follower and movable in a direction of an optical axis; and
   a cam mechanism for moving said moving frames comprising:
   inner and outer cylindrical members respectively having a cam slot and a cam groove, said cam groove being transverse to an optical axis;
   means for preventing movement of said inner and outer cylindrical members in a longitudinal direction along said optical axis;
   said outer cylindrical member being rotatable about said inner cylindrical member; and
   said cam followers extending through said cam slot and being fitted in the cam groove to move said moving framers, and only one end of the cam groove being open to an end surface of its associated cylindrical member.

5. The lens barrel as defined in claim 4, further comprising a plurality of lenses, each of said moving frames holding one of said lenses.

6. A lens barrel comprising:
   a plurality of moving frames each having a cam followers:
   a cylindrical cam ring having a plurality of cam grooves for moving said plurality of moving frames, the cam grooves each having one end communicating with a common entry groove, said common entry groove being opened to a common end surface of the cam ring; and
   an annular fixed frame having a cam slot acting on said cam follower to limit movement of said plurality of moving frames only in a direction of an optical axis, the cam slot of said fixed frame cam ring being opened at least on one end side of the fixed frame.

7. The lens barrel as defined in claim 6, further comprising a plurality of lenses, each of said moving frames holding one of said lenses.

8. A lens barrel comprising:
   a plurality of moving frames each having a cam follower;
   an annular fixed frame having a plurality of cam slots extending parallel to an optical axis and receiving said cam followers for moving said plurality of moving frames, the cam slots each having an end communicating with an entry slot, said entry slot being opened to a common end surface of the fixed frame; and
   a cylindrical cam ring having a cam groove transverse to the optical axis and acting on said cam followers and cooperating with said fixed frame to limit movement of said plurality of moving frames in the direction of the optical axis, the cam grooves being opened on one end side of the cam ring.

9. The lens barrel as defined in claim 8, further comprising a plurality of lenses, each of said moving frames holding one of said lenses.

10. A lens barrel, comprising:
    a plurality of moving frames each having a cam follower:
    a fixed frame having cam slots, one end of each cam slot being opened to an end surface of the fixed frame; and
    a cam ring having moving cam grooves each for limiting movement of an associated moving frame in a direction of an optical axis, the cam grooves being equal in number to the number of moving frames; and
    said cam ring having a common assembling cam groove, all of the moving cam grooves communicating with the assembling cam groove, and an end of the assembling cam groove being opened to a common end surface of the cam ring, wherein opposite cam groove open portions coincide in a circumferential direction and also in a direction of an optical axis in an assembly of said fixed frame and cam ring, thereby allowing an assembling of said plurality of moving frames successively in the direction of said optical axis.

11. The lens barrel as defined in claim 10, further comprising a plurality of lenses, each of said moving frames holding one of said lenses.

12. A lens barrel comprising:
a plurality of movable frames each having a cam follower:
a cam ring having moving cam grooves for moving said cam followers, one each of end of said cam grooves being opened to an end surface of the cam ring; and
a fixed frame having a moving cam slot receiving said cam followers and cooperating with said moving cam grooves for limiting movement of the movable frames by said moving cam grooves only in a direction of an optical axis, the moving cam grooves being equal in number to the number of said movable frames; and
said cam ring having an assembling cam groove, all of the moving cam grooves communicating with the assembling cam groove, and one end of the assembling cam groove being opened to a common end surface of the cam ring;
wherein opposite cam groove open portions coincide in a circumferential direction and also in the direction of said optical axis in an assembly of said fixed frame and cam ring, thereby allowing an assembling of said plurality of movable frames successively in the direction of said optical axis.

13. The lens barrel as defined in claim 12, further comprising a plurality of lenses, each of said moving frames holding one of said lenses.

14. A lens barrel, comprising:
a plurality of moving frames each having a set of three cam followers;
a fixed frame having a set of three cam slots each receiving one of the three cam followers of said moving frames, an end of each cam slot being opened to an end surface of the fixed frame; and
a cam ring having groups of three moving cam grooves each group for moving an associated moving frame in a direction of an optical axis, and also with one set of three assembling cam grooves, the moving cam grooves of each group communicating with one of the assembling cam grooves, and one end of each of the assembling cam grooves being opened to a common end surface of the cam ring;
wherein opposite cam groove open portions coincide in a circumferential direction and also in a direction of an optical axis in an assembly of said fixed frame and cam ring, thereby allowing an assembling of said plurality of moving frames successively in the direction of said optical axis.

15. The lens barrel as defined in claim 14, further comprising a plurality of lenses, each of said moving frames holding one of said lenses.

16. A lens barrel, comprising:
a plurality of movable frames each having a set of three cam followers;
a cam ring having sets of three cam grooves, one end of each cam groove of a set being opened to a common end surface of the cam ring; and
a fixed frame having a cam slot group cooperating with said cam grooves for limiting movement of the movable frames only in a direction of an optical axis;
the sets of three cam grooves being equal in number to the number of said movable frames;
the cam ring further including one set of three assembling cam grooves, one moving cam groove of each set of moving cam grooves communicating with one of the assembling cam grooves, and one end of each of the assembling cam grooves being opened to an end surface of the fixed frame;
wherein opposite cam groove open portions coincide in the circumferential direction and also in a direction of the optical axis in an assembly of said fixed frame and cam ring thereby allowing an assembling of said plurality of movable frames successively in the direction of said optical axis.

17. The lens barrel as defined in claim 16, further comprising a plurality of lenses, each of said moving frames holding one of said lenses.

18. A lens barrel, comprising:
a plurality of moving frames each having a cam follower; and a rotatable cylindrical cam ring having a plurality of cam grooves receiving said cam followers for moving said plurality of moving frames each in a direction of an optical axis and an assembling cam groove, one end of said plurality of cam grooves communicating with said assembling cam groove, the assembling cam groove extending to one common end of the cam ring and a fixed frame having slots receiving said cam followers for limiting said moving frames to only linear movement.

19. The lens barrel, as defined in claim 18, further comprising a plurality of lenses, each of said moving frames holding at least one of said lenses.

20. A lens barrel comprising:
a rotatable cam frame provided with a plurality of cam grooves and having a communicating groove communicating with said plurality of cam grooves and extending to a common end surface of the cam frame in a direction of an optical axis;
a fixed frame rotatably supporting said cam frame and having cam slots; and
a plurality of cam followers communicating with said plurality of cam grooves and cam slots to move a lens frame coupled to said cam followers back and forth in the direction of said optical axis and prevent rotation of the lens frame.

21. The lens barrel as defined in claim 20, wherein the plurality of cam grooves and the communicating groove are bottomed grooves provided on an inner peripheral surface of the cam frame.

22. The lens barrel as defined in claim 20, wherein the cam frame is formed of a plastic base material.

23. The lens barrel as defined in claim 20, wherein the communicating groove is provided at a location which does not interfere with the plurality of cam followers over an operating range of the lens barrel.

24. The lens barrel as defined in claim 20, wherein the communicating groove is a rectilinear groove extending in the direction of said optical axis.

25. The lens barrel as defined in claim 20, wherein the plurality of cam grooves each have a different width.

26. The lens barrel of claim 25 wherein the cam followers fitted into said cam grooves have a diameter nearly equal to the width of the cam groove receiving the associated cam follower, said diameters all being different from one another.

27. A lens barrel comprising:
a fixed frame made immovable by securement to a camera body;
a cam frame rotatable about an optical axis and relative to the fixed frame, a plurality of cam grooves being provided therein, and having a communicating groove extending to one end surface of the cam frame in the direction of said optical axis and communicating with said plurality of cam grooves;
a plurality of lens holding frames for holding optical lenses; and
cam followers provided on said lens holding frames, each engaging an associated one of the plurality of cam grooves, for changing a position of the lens holding frames in the direction of said optical axis responsive to a rotation of the cam frame about the optical axis.

28. The lens barrel as defined in claim 27, further comprising means for preventing the cam followers from leaving a portion of the cam grooves and entering the communicating groove after assembly of the lens barrel.

29. The lens barrel as defined in claim 27, wherein the means for preventing includes blocking means whereby portions of the plurality of cam grooves communicating through the communicating groove lie outside of a moving range of all the cam followers.

30. The lens barrel as defined in claim 27, wherein the communicating groove communicates with one end portion of the plurality of cam grooves along the direction of said optical axis.

31. A method for assembling a lens barrel comprised of a first hollow cylinder having a mounting flange at one end thereof for securing the first cylinder to a camera body, and provided with rectilinear cam slots extending to said one end of said mounting flange, and a hollow cam cylinder provided with a plurality of cam grooves, each cam groove functioning to position an associated lens assembly upon rotation of the cam cylinder, and a plurality of lens assemblies each comprising a lens and a frame supporting said lens, and at least one cam follower extending radially outwardly from each frame, said cam cylinder being provided with a common entry groove extending to one end of said cam cylinder, said common entry groove having an inward portion thereof communicating with selected ones of a plurality of said cam grooves, said assembly method comprising the steps of:
(a) placing said cam cylinder on said first cylinder so that it encircles and is rotatable about an outer periphery of said first cylinder:
(b) aligning the common entry groove of said cam cylinder with a rectilinear slot of said first cylinder;
(c) inserting the lens frame of a first one of said lens assemblies into an interior of said first cylinder with the cam follower thereof being aligned with the rectilinear slot of said first cylinder, and an entry end of the entry groove of said cam cylinder;
(d) moving said first lens frame into said first cylinder to simultaneously move said cam follower along the rectilinear slot of said first cylinder and along the entry groove of said rotatable cam cylinder towards an entrance of one cam groove;
(e) rotating said first lens assembly frame to move the cam follower provided thereon into a cam groove further removed from an entry end of said entry groove to place the cam follower of said first lens assembly into the associated cam groove;
(f) realigning the entry groove of said cam cylinder with the rectilinear slot of said first cylinder;
(g) inserting a lens frame of a second one of said lens assemblies into the interior of said first cylinder with the cam follower secured thereto being aligned with the slot of said first cylinder and the entry end of the entry groove of said cam cylinder;
(h) moving said second lens frame into said first cylinder to simultaneously move the cam follower of said second lens frame along the rectilinear slot and the entry groove toward an entrance of another cam groove; and
(i) rotating said second lens frame to move the cam follower mounted thereon into the other cam groove for driving said second lens assembly.

32. The method of claim 31 further comprising the step of:
(j) mounting a limiting clip upon an end of said first cylinder remote from said mounting flange for preventing axial movement of said rotatable cam cylinder while freely permitting rotation thereof.

33. The method of claim 31 further comprising the step of:
(k) mounting the lens barrel on a camera body so that the mounting flange engages said camera body and said first cylinder is fixed against movement on the camera body.

* * * * *